US009800532B2

(12) United States Patent
Chakra et al.

(10) Patent No.: US 9,800,532 B2
(45) Date of Patent: Oct. 24, 2017

(54) INTELLIGENT PRESENTATION OF MULTIPLE PROXIMATE AUDIBLE ALERTS

(75) Inventors: Al Chakra, Apex, NC (US); Liam Harpur, Dublin (IE); Michelle M. Purcell, Killurin (IE); John Rice, Tivoli (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 922 days.

(21) Appl. No.: 13/487,382

(22) Filed: Jun. 4, 2012

(65) Prior Publication Data
US 2013/0325951 A1 Dec. 5, 2013

(51) Int. Cl.
*G06F 15/16* (2006.01)
*H04L 12/58* (2006.01)

(52) U.S. Cl.
CPC ............. *H04L 51/24* (2013.01); *H04L 51/20* (2013.01)

(58) Field of Classification Search
CPC ......... H04L 51/04; H04L 51/28; H04L 51/20; H04L 51/24; H04L 51/00; H04L 65/00; H04L 51/36; H04W 4/12
USPC ...... 709/204; 340/5.52, 5.54, 5.56; 455/456, 455/465
See application file for complete search history.

(56) References Cited

U.S. PATENT DOCUMENTS

| 6,396,399 | B1 | 5/2002 | Dunlap | |
|---|---|---|---|---|
| 7,181,495 | B2* | 2/2007 | Skladman | H04L 51/12 709/203 |
| 7,567,165 | B2 | 7/2009 | Epley | |
| 7,636,444 | B2 | 12/2009 | Cronin | |
| 7,983,426 | B2 | 7/2011 | Schuler et al. | |
| 8,234,395 | B2* | 7/2012 | Millington | H04J 3/0664 709/205 |
| 2004/0246121 | A1* | 12/2004 | Beyda | H04L 12/1827 340/506 |
| 2006/0040647 | A1* | 2/2006 | Moody | H04M 1/72547 455/412.2 |
| 2007/0288580 | A1* | 12/2007 | Kaminsky et al. | 709/206 |
| 2008/0160976 | A1* | 7/2008 | Virolainen | H04M 3/568 455/416 |
| 2008/0313297 | A1* | 12/2008 | Heron | H04L 51/04 709/207 |
| 2009/0307715 | A1* | 12/2009 | Santamaria | G06F 9/4418 719/318 |
| 2009/0323985 | A1* | 12/2009 | Garudadri | H03F 1/0222 381/104 |
| 2010/0011070 | A1* | 1/2010 | Zhao | H04L 51/24 709/206 |
| 2010/0219937 | A1* | 9/2010 | Heikes | G06Q 10/107 340/7.62 |

(Continued)

*Primary Examiner* — Joseph E Avellino
*Assistant Examiner* — Binod J Kunwar
(74) *Attorney, Agent, or Firm* — Cuenot, Forsythe & Kim, LLC

(57) ABSTRACT

A computing device can receive an incoming message. The incoming message can be one directed to a set of different client machines at approximately the same time. The computing device can perform a mitigation action that alters a presentation characteristic of the audible alert for the incoming message. The mitigation action ensures that the computing device and at least a subset of the other client devices within a predefined audio range of the computing device do not audibly present alerts for the incoming message in an unsynchronized manner.

11 Claims, 3 Drawing Sheets

(56) References Cited

U.S. PATENT DOCUMENTS

2012/0036208 A1* 2/2012 Beisel .......................... 709/206
2012/0072844 A1* 3/2012 Lefrancois des
 Courtis ................. G06Q 30/02
 715/736
2013/0067013 A1* 3/2013 Dgani .................... H04L 29/06
 709/206

* cited by examiner

INTELLIGENT PRESENTATION OF MULTIPLE PROXIMATE AUDIBLE ALERTS

BACKGROUND

The present invention relates to the field of audio notifications.

Currently, text exchange utilizes electronic messages which play a pivotal role in enterprise collaboration efforts. The electronic message can be delivered through various modes such as email, chat and Instant Messaging (IM) clients, wherein the messages are delivered in real-time. Conventionally, audio alerts are generated on the recipient's end device upon receipt of the electronic message. The generated audio alerts facilitate immediate notification of the user that a message has been received, and are designed to capture the attention of the user or electronic message recipient.

In enterprise collaboration efforts, group messages are often sent from one sender to a multitude of recipients within the same office environment (e.g., in an environment with an open office floorplan, where each message recipient has his or her own space in a larger shared office space). When the group message is received at the client machines of the group message recipients, the audio alerts are also generated on each of the group message recipients' client machines separately. Every member of the group message recipient list is thus notified that he or she has received an electronic message requiring his or her attention. Audio alert preferences are generally established at each client device individually, even in a shared environment where multiple individuals (including those that are not users of the respective client device) will be subject to hearing the notification alert.

BRIEF SUMMARY

One aspect of the disclosure includes a method, system, device, and computer program product to intelligently present alerts. This intelligent presentation can depend on a set of one or more mitigation actions designed to prevent devices proximate to each other from presenting alters for a common message in a disharmonious manner. In one embodiment, a computing device can receive an incoming message. The incoming message can be one directed to a set of different client machines at approximately the same time. The computing device can perform a mitigation action that alters a presentation characteristic of the audible alert for the incoming message. The mitigation action ensures that the computing device and at least a subset of the other client devices within a predefined audio range of the computing device do not audibly present alerts for the incoming message in an unsynchronized manner.

Another aspect of the invention can include a system to suppress, merge, or synchronize audio alerts in a group messaging environment. The system can include multiple client machines which can be configured to generate an audio alert upon receipt of the group message. The multiple client machines can also include a volume detection module configured to detect a volume level of a generated audio alert from a nearby client machine. Further, the system can include a communication channel configured to communicate the group message and the detected volume level. Further, the system can include one or more servers including a monitoring engine configured to detect whether a group of client machines are recipients of a group message, a sending module configured to send the group message to the group of client machines, and a receiving module configured to receive the detected volume level of the audio alert. Additionally, the system can include a suppression module at the client machine to suppress the audio alert upon receipt of instruction from the server to do so. The instruction to suppress the client machine audio alert generation can depend on one or more rules and a set of parameters wherein the rules and the set parameters can be stored in a central database and can be managed at the server. The rules can include, but are not limited to, based on an alert volume level threshold triggering an associated instruction for suppression of an audio alert if the detected volume level of such an audio alert exceeds a pre-determined volume level threshold. Further rules that can be communicated can include parameters such as proximity settings with associated instructions on whether or not to suppress the audio alert on the respective client machine.

DETAILED DESCRIPTION

Figure 1:
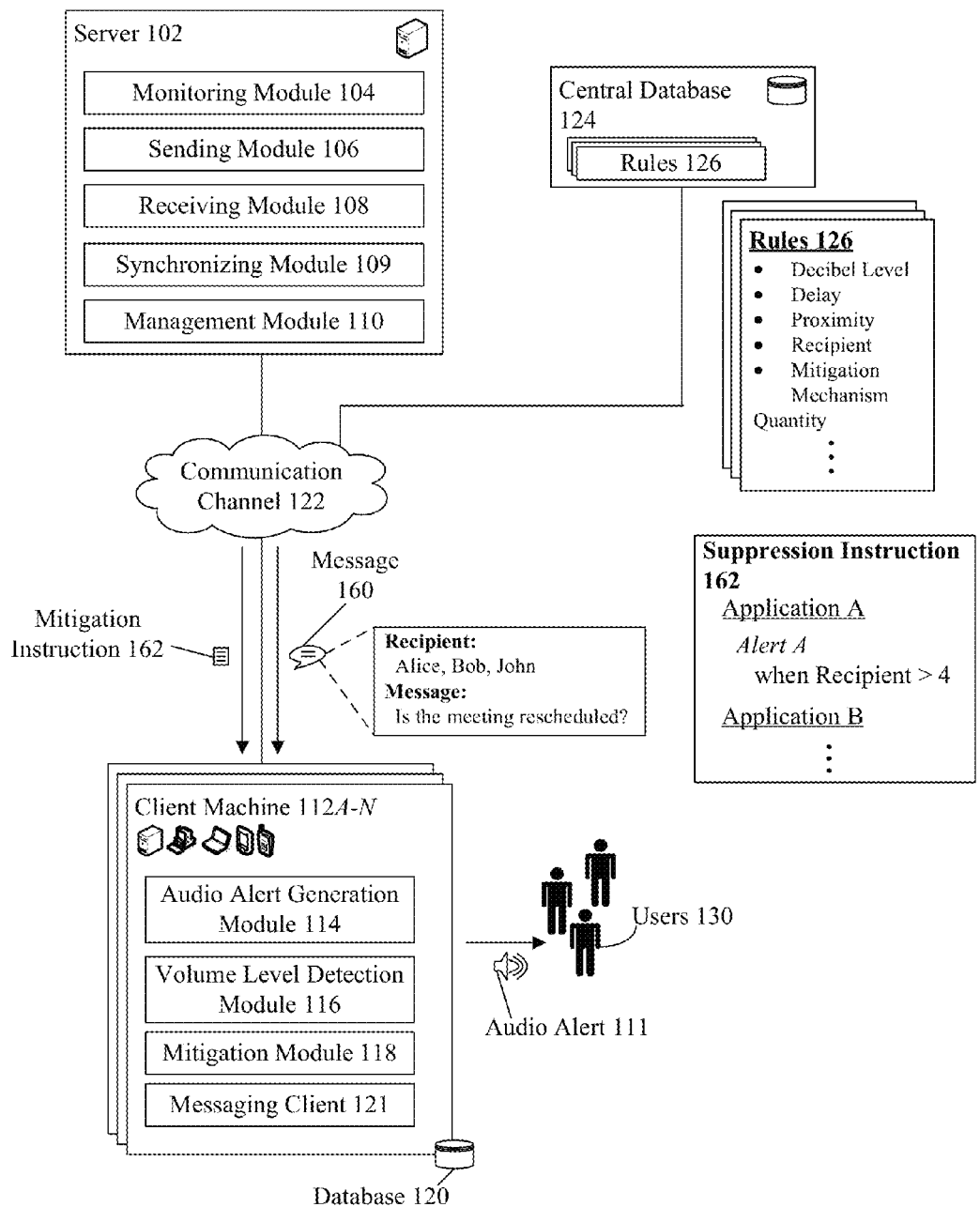
FIG. 1 is a block diagram illustrating a system to mitigate problems with multiple audio alerts in a group messaging environment in accordance with an embodiment of the inventive arrangements disclosed herein.

Conventional alert systems neglect to account for some of the common disadvantages of generating an audio alert upon receipt of a message at a client machine. Such disadvantages can include the audio alerts being a distraction to other workers or individuals within the same geographic location or office space as well as the inability to synchronize audio alerts for a single message across various message recipient client machines. Synchronization problems can be due to inherent network latencies or other time delays and can further compound the number of distracting audio alerts experienced by members of the shared environment (such as a shared office space) that are not part of the group message recipients.

In conventional audio alert management systems, each recipient of the group message needs to disable the audio alert individually after being asked to do so. However it is difficult for the non-message-recipient individuals to identify all users who are intended to receive the group message and the respective location of the intended recipients. Further, even when the list of message recipients can be ascertained, it is inconvenient and time consuming to inform all group message recipients of the request to disable their audio alerts. Another issue in such a scenario can be that some members of the group message recipient list can be out of the office, thus not being able to disable their notification audio alerts.

The present disclosure is a solution for intelligent presentation of proximate audible alerts. In this intelligent presentation problems with overly distracting noises resulting from alerts being presented on different proximate devices can be mitigated through alert suppression, alert synchronization, and the like. That is, multiple proximate audio alerts can be de-duplicated and/or synchronized to reduce noise pollution within a shared environment (e.g., open plan workplace).

In embodiments, multiple proximate audio alerts can be automatically determined. The proximate audio alerts can be determined utilizing hardware and/or software within a client device and/or a server device. For example, in one embodiment, a microphone within a client can detect proximate alerts originating from an application executing within a proximate computer and the client (e.g., instant messenger application). In the embodiment, subsequent alerts can be selectively suppressed based on one or more rules. For example, when a subsequent alert occurs within twenty seconds of a previous alert, the subsequent alert can be suppressed (e.g., audio of the alert suppressed) and a visual notification can be presented instead.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

FIG. 1 is a block diagram illustrating a system 100 to mitigate problems with multiple audio alerts in a group messaging environment in accordance with an embodiment of the inventive arrangements disclosed herein. The system 100 can include a server 102, a communication channel 122, a central database 124, and a group of client machines 112A-N. For example, a group of client machines can include three or more computers. The group of client machine 112A-N can interact with server 102 over a communication channel 122. As used herein, message 160 can be a message conveyed to two or more computers of a group of three client machines. Message 160 can be associated with a text exchange session or with other events/communications. The server 102 can include a monitoring engine 104 to detect whether the initiated message is a group message, a sending module 106 to send the group message, a receiving module 108 to receive communication initiated from one of the client machines among the group of the client machines, a synchronizing module 109 to synchronize an audio presentation of a set of two or more alerts in a proximate geospatial region, and a management engine 110 to determine which of the selective client machines are instructed to perform which mitigation actions. Further, the server 102 can include a central database to store various software, rules 126 (e.g., set of parameters) as described in present invention.

The communication channel 122 can include a network to facilitate electronic communication between server 102, database 124 and the client machines 112A-N. The communication channel 122 can include, but is not limited to, Internet, a local area network (LAN), a wide area network (WAN), a virtual private network (VPN), a wireless network, etc. Communication could occur via a direct hardwired connection (e.g., serial port), or via an addressable connection that can utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish inter-connectivity. Further, as indicated above, communication could occur in a client-server or server-server environment.

Each of the client machines 112A-N can include an audio alert generation module 114, an optional volume level detection module 116, a mitigation module 118, a messaging client 121, a database 120, and the like. Further, each of the client machine 112A-N can also include external of internal components used to provide input or display the message such as a mouse, a keyboard, a display device. The audio alert generation module 114 can generate an audio alert 111 upon receiving the message 160, whereby the volume level detection module 116 can detect the volume level of the generated audio alert 111, and the mitigation module 118 can suppress, synchronize, or otherwise adjust the audio alert 111 subsequently after receiving mitigation instructions 162 to take an alert mitigation action. Database 120 can store various applications of the client machine and the address of the recipients. Further, the message 160 can include, but is not limited to, an email, a text message and a multimedia message.

The message 160 can be sent using a messaging client 121 which can permit users 130 to send and receive message 160 via client machines 112A-N. It can be apparent to a person skilled in the art that the messaging client can include, but is not limited to, applications of message communicator, email client, and chatting client. Further, the messaging client can enable the user of the client machine to manage the list of addresses of possible recipients, such as creating a group of the recipients (e.g., users 130). Further, the group of the recipients and senders can be defined in different groups such as social groups, professional groups, and the like.

According to one embodiment of the invention, one of the client machines 112A-N, such as the client machine 112A can send a group message to multiple client machines such as client machine 112B-N using the input component. The group message can be sent, using the messaging client, by the user of the client machine 112A. The group message can be received at server 102 using a receiving module 108. Upon receiving the message 160 at server 102, the monitoring engine 104 can detect whether the intended message 160 is a group message. Subsequently the sending module 106 can instruct that the message 160 be sent to the client machines 112B-N. On receiving the message 160 at the client machines 112B-N, the audio generation module 114 can generate audio alert 111 on each of the client machines 112B-N. The generated audio alerts 111 can capture the attention of the users 130 and notify them that the message 160 has been received on their respective client machines.

Conventionally, the audio alert 111 on each of the client machine 112B-N can be generated and presented intermittently (for example out of synch) due to delay in receiving the group message. The delay in delivery of the group message can occur due to various reasons such as due to delay in network transmission, account time delay and lag for different client machines. These factors can be tracked by synchronization module 109 and adjusted for. Therefore by default, the audio alerts 111 can be generated in unsynchronized sequence due to the time interval of delivery the group message and alert latencies.

In one embodiment, a time synchronization action (such as one that relies on a common synchronized time source, such as a GPS provided time) can impose a delay before audio alert 111 playback from each of the client machines 112A-N. The mitigation instructions 162 can state that playback is to be delayed until a specified time (using the synchronized time source) to ensure that the playback of the audio alerts 111 occur "concurrently".

In one embodiment, the mitigation instructions 162 can force a specific ring tone for the audio alert, to ensure that different alerts 111 that are synchronized to each other are "pleasing" when played in conjunction with each other. Playback of synchronized alerts 111 need not (but may) be identical to each other (when played upon different machines 112A-N). The instructions 162 may ensure the playback of synchronized audio alerts 111 is harmonious. For example, each of a set of identified client machines 112A-N can play different notes (from other proximate devices) in a synchronized sequence, where the sum of the playback represents an aggregate audio alert 111 heard by the users 130. In another embodiment, different simulated instruments can be simulated (one from each proximate client machine) to ensure a "symphony" of different complementary sounds heard by the users 130 when the client machines 112A-N play a synchronized alert 111.

In one embodiment of the disclosure, a recipient of message 160 can define different audio alerts for different group members such as for social groups and professional groups, and the like. The specific type of audio alert issued can facilitate rapid recognition of the type of group message received and potentially a sender's identity.

In another embodiment of the disclosure, the volume detection module 116 can detect the volume level of the audio alert 111 where the volume detection module 116 can detect the volume level for the audio alert generated by the nearby client machine. For example, the volume detection module 116 of the client machine 112E can detect the volume level of the audio notification generated by the audio alert 111 created by the audio generation module of the client machine 112C. Subsequently, the volume level of the generated audio alerts 111 can be detected and provided to the server 102 through the communication channel 122. Upon receiving the volume level of the audio alert 111, the management engine 110 can determine the client machine(s) for which to issue instructions for the audio alerts to be suppressed and/or synchronized. The management engine 110 can include one or more rules 126 (e.g., decibel level, delay interval, etc.). For example, the rule can include a volume level threshold such as a volume level of 23 decibel and a proximity setting of the client machine 112B-N. If the detected audio alert volume level of the client machine 112B-N exceeds the volume level threshold of 23 decibel, then the audio alert of the respective client machine can be suppressed. Similarly, the set of parameters can be used to determine client machines instructed to suppress or synchronize their respective audio alerts. The instruction 162 for suppression of audio alerts on the selective client machine can be communicated through the communication channel 122. Upon receiving the instruction 162, the mitigation module 118 can suppress or synchronize the audio alert 111. One example of such a rule and parameter combination for the determination of audio suppression (or synchronization) instruction can be between the client machine 112E and the client machine 112C: should the user of the client machine 112E and client machine 112C be less than three feet apart, the audio alert on the client machine 112E is instructed for suppression (or synchronization).

According to another embodiment of the invention, the respective user of the client machine can be informed of the suppression/synchronization of the audio alert 111. Additionally, the respective user of the client machine can be informed of the shared audio alert (e.g., the nearest client machine) on which the audio alert is not suppressed (assuming alert suppression occurred on that client machine). For example, if the audio alert of the client machine 112C is not suppressed while the audio alert of the client machine 112E is suppressed, then the user of the client machine 112E is informed that the audio alert of the client machine 112C is active and that a certain audio alert also applies to the user of client machine 112B. Subsequently, the user of the client machine 112E can hear the audio alert generated at the client machine 112C as a notification of receipt of a group message. Appreciatively, suppression, synchronization, and other mitigation actions can dynamically change as the positions and make-up of the users 130 in a proximate area changes.

According to one embodiment of the invention, the user of a client machine 112E can re-enable his or her client machine's audio alert individually. The permission to enable the suppressed audio alert can be provided to all users or a selective set of users based on a set of predefined rules and the predefined set of the parameters.

The suppression of the audio alert aids in minimizing the duplicate audio alerts for a group of client machines, and can serve to synchronize the audio alerts associated with a group message sent to a number no client machines in a proximate setting as lesser number of audio alerts are generated, allowing for only minimal delay in network transmission and alert latencies. In one embodiment, the alert latency to end-users 130 may not be highly significant and can be deliberately imposed to facilitate and/or simplify a synchronization of alerts.

Drawings presented herein are for illustrative purposes only and should not be construed to limit the invention in any regard. In one instance, system 100 can represent a Service Oriented Architecture (SOA), distributed computing system, networked computing environment, and the like. It should be appreciated that message 160 can include, a header, a body (e.g., message contents), and the like. Audio alert 111 can be a sound notification which can be associated with an application (e.g., messaging client 121) event (e.g., receiving message 160), an operating system event, and the like. In one embodiment, multiple audio alerts can be de-duplicated and a different audio alert can be presented. In the embodiment, a unique audio alert can be utilized to indicate multiple audio alert suppression/synchronization has occurred. It should be appreciated that system 100 can operate in real-time or near real-time. Further, one or more components (e.g., central database 124) can be optional components, permitting the functionality of system 100 is retained.

Figure 2:
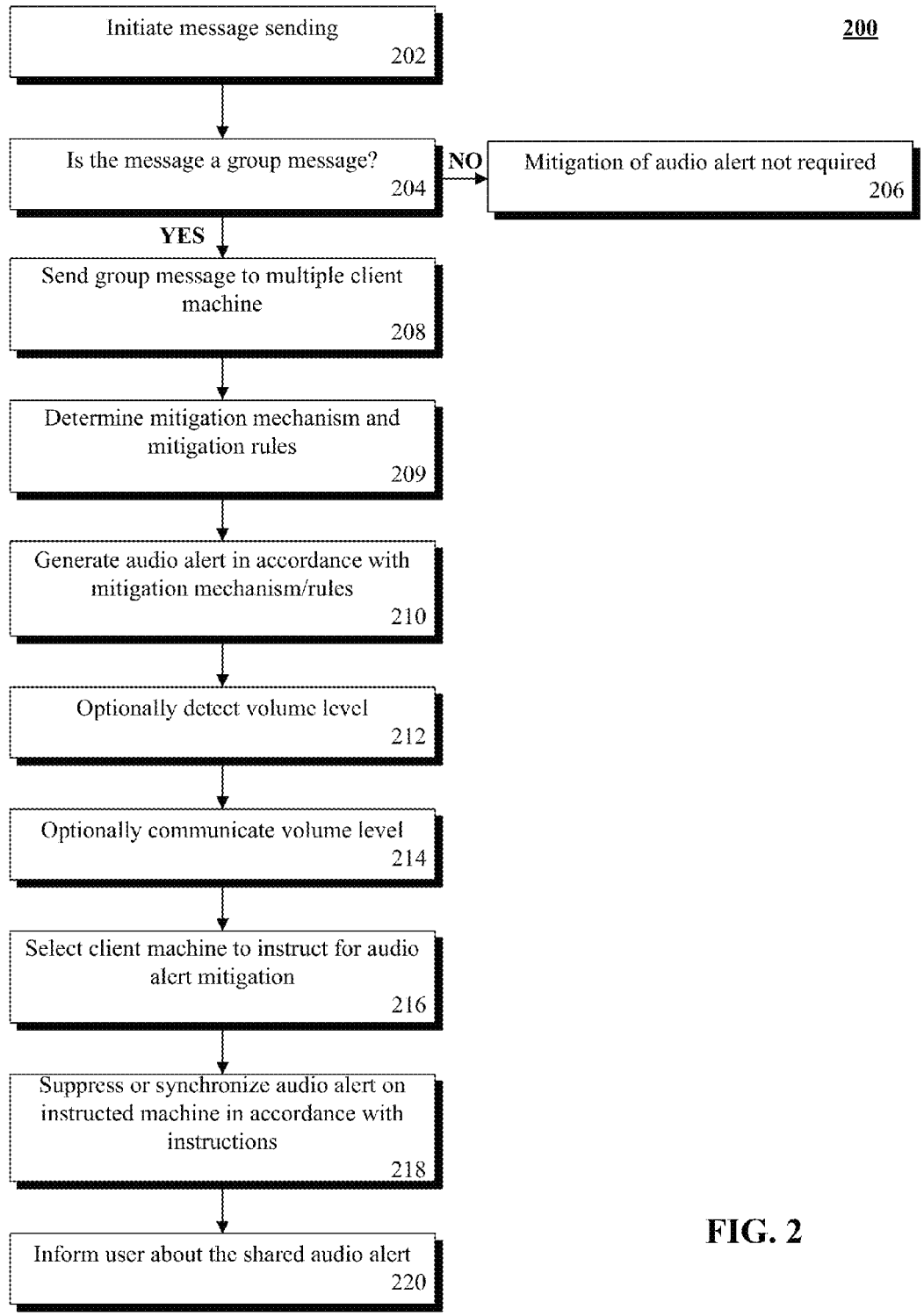
FIG. 2 is a flow chart of a method illustrating the process of suppressing or synchronizing audio alerts on a selective group client machine in accordance with an embodiment of the inventive arrangements disclosed herein.

FIG. 2 is a flow chart illustrating the method 200 of suppressing or synchronizing audio alerts on selective client machines in accordance with an embodiment of the inventive arrangements disclosed herein. It should be noted the FIG. 2 is described in conjunction with FIG. 1. In step 202, a process of sending a group message, hereafter referred to as message 160, to multiple client machines, hereafter referred to as a group client machines, is initiated by one of the client machines 112A-N. For example, client machine 112A is interested in sending a group message to the users of the client machines 112B-N of FIG. 1. The message can be sent using a messaging client. Further, the messaging client can enable the user of the client machine to manage the list of addresses of the recipients such as creating a group of the recipients. The group of the recipients and senders can be defined in different groups such as social groups, professional groups, and the like. The instruction 162 to send a group message to the group client can be provided to the server 102 using a communication channel 122 of FIG. 1.

In step 204, a monitoring engine can detect whether the intended message to be sent is a group message or not (i.e., is the message intended to be delivered to the group client machines or a single client machine). If the message is intended to be sent to a single client machine, then the suppression of the audio alert is not required as represented by the step 206. However, if the message is intended to be sent to the group client machines such as to the client machine 112B-N, the message is recognized as a group message and the method can proceed to step 208.

In step 208, the group message can be sent, using the sending module 106 of FIG. 1, to the multiple client machines such as to the client machine 112B-N. The delivery of the group message can be delayed due to various reasons such as due to delay in network transmission, account time delay and lag for different client machines. In step 209, a mitigation mechanism (e.g., suppression, synchronization, other) and mitigation rules to be applied to group messages can be determined.

In step 210 each of the client machine 112B-N may generate an audio alert, wherein the audio alerts are generated upon receipt of the group message. The delay in delivery of message and alert latencies can lead to unsynchronized generation of audio alerts. These unsynchronized generated audio alerts can be considered duplicate audio alerts. In other words, each of the client machines 112B-N can generate their respective audio alert at a different time interval. Embodiments of the invention reduces duplication (or time spacing) of these audio alerts within a geospatial region so that users and bystanders need not hear the unsynchronized duplications of audio alerts. Thus, generated audio alerts can be generated in accordance with the determined mitigation mechanism and mitigation rules.

According to one embodiment of the invention, the recipient can define different audio alerts for different group members such as for the social groups and the professional groups. The specific type of alert issued can facilitate rapid recognition of the type of group message received and potentially a sender's identity. In one embodiment, the different alerts can result in different vibrations, visible notifications, and/or other non-audio distinguishing characteristics. Thus, an audio environment may be unaffected by different group members establishing settings to help distinguish one type of alert from another, while ensuring group alerts are still suitably mitigated to reduce alert induced noise pollution.

In step 212, each of the client machines 112B-N can detect the volume level of the unsynchronized audio alert generated among the group of client machines 112B-N using volume level detection module 116 of FIG. 1. For example, the volume level detection module 116 of client machine 112E can detect the audio alert volume level generated by client machine 112C.

In step 214, the detected volume level can be communicated to the server 102 using the communication channel 122 as shown in FIG. 1. The detected volume level can be provided to the management engine 110 through the receiving module 108 of FIG. 1. The selection of the client machines to receive instructions to suppress their respective audio alerts can be facilitated by the management engine 110 as represented by the step 216. One or more rules and a set of parameters can be used by the management engine 110 in order to select the specific client machines for audio alert mitigation. The set of rules can include, but is not limited to, a volume level threshold above which the respective client machine is instructed to suppress the audio alert. If the detected volume level exceeds the volume level threshold as defined in the rules, the respective client machine for which the volume is detected can be instructed to suppress or synchronize the audio alert. The set of parameter includes, but is not limited to, decibel level, delay interval, proximity of the client machines to one another, quantity of recipients on which the audio alert is suppressed/synchronized, and the like.

In step 218, the audio alert can be suppressed/synchronized on the instructed client machine, using the mitigation module 118 of FIG. 1. The suppression/synchronization of the audio alert can results in fewer audio alerts (e.g., removal of the duplicate audio alerts) in an audio environment. In step 220, the user of the client machine of suppressed/synchronized audio alert can be informed of the audio alert mitigation action, wherein the user can be provided the information on which client machine's audio alert is still active and can also pertain to them. For example, a visual notification can be presented within a display of a client device utilized by the user. The notification can be designed to facilitate proper notification and advise the user of a suppressed audio alert client machine which proximate client machine's audio alert that is not suppressed will also pertain to him or her.

According to one embodiment of the invention, the user of the client machine for which the audio alert is suppressed can disable the automatic audio alert mitigation. The permission for disabling the automatic audio alert mitigation can, in one embodiment, be provided to the users of all client machines. Alternatively, the disabling of the audio alert mitigation can be provided based on the predefined rules and the set of parameters.

The suppression (as opposed to synchronization) of the audio alerts minimizes the number of audio alerts generated upon receiving the group message. Therefore the users of the client machine who are not participating in the group message interaction remain undistracted due to the minimized noise pollution in the shared environment.

Drawings presented herein are for illustrative purposes only and should not be construed to limit the disclosure in any regard. Method 200 can be performed in real-time or near real-time. Method 200 can be performed continuously for the duration of a text exchange session (e.g., instant message session). For example, steps 204-220 can be executed each time a message is sent or received.

Figure 3:
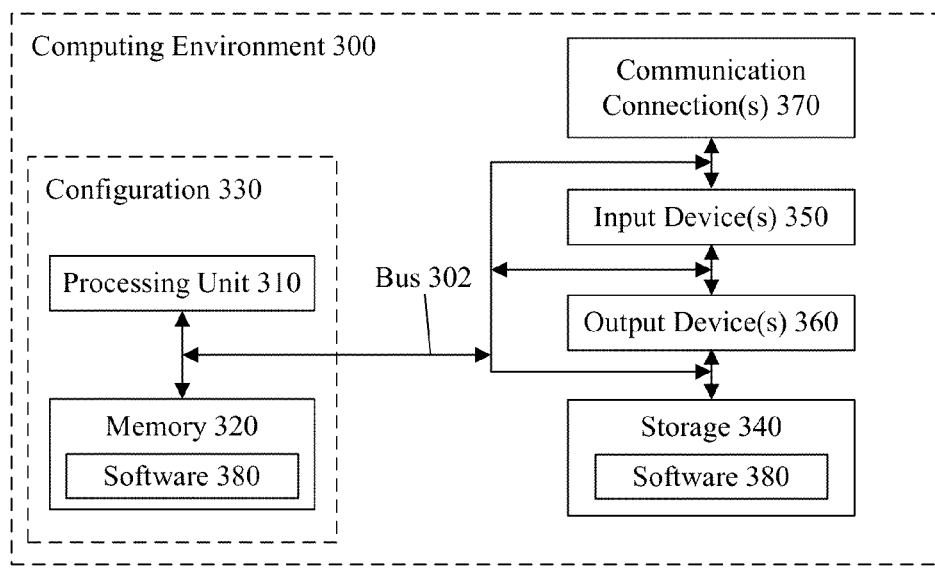
FIG. 3 is a schematic diagram of a system illustrating an embodiment for a generalized computer network arrangement in accordance with an embodiment of the inventive arrangements disclosed herein.

FIG. 3 illustrates a generalized example of a computing environment 300 in accordance with an embodiment of the inventive arrangements disclosed herein. The computing environment 300 is not intended to suggest any limitation as to scope of use or functionality of described embodiments.

With reference to FIG. 3, the computing environment 300 can include, within it's basic configuration 330, at least one processing unit 310 and memory 320. The processing unit 310 can execute computer-executable instructions and can be a real or a virtual processor. In a multi-processing system, multiple processing units can execute computer-executable instructions (e.g., software 380) to increase processing power. The memory 320 can be volatile memory (e.g., registers, cache, RAM), non-volatile memory (e.g., ROM, EEPROM, flash memory, etc.), or some combination of the two. In some embodiments, the memory 320 can store software 380 implementing described techniques.

Computing environment 300 can have additional features. For example, the computing environment 300 can include storage 340, one or more input devices 350, one or more output devices 360, and one or more communication connections 370. An interconnection mechanism such as a bus 302, controller, or network components can interconnect the components of the computing environment 300. Typically, operating system software (not shown) can provide an operating environment for other software executing in the computing environment 300, and can coordinate activities of the components of the computing environment 300.

Storage 340 can be removable or non-removable, and includes magnetic disks, magnetic tapes or cassettes, CD-ROMs, CD-RWs, DVDs, USB drive, or any other medium which can be used to store information and which can be accessed within the computing environment 300. In some embodiments, storage 340 can store instructions for software 380.

Input device(s) 350 can be a touch input device such as a keyboard, mouse, pen, trackball, touch screen, or game controller, a voice input device, a scanning device, a digital camera, or another device that provides input to the computing environment 300. Output device(s) 360 can be a display, printer, speaker, or another device that provides output from the computing environment 300.

Communication connection(s) 370 can enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 300, computer-readable media include memory 320, storage 340, communication media, and combinations of any of the above.

The present invention can be implemented in numerous ways including as an apparatus, method, or a computer program product such as a computer readable storage medium or a computer network wherein programming instructions are communicated from a remote location.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. On a computing device operative to play an audible alert in response to receiving an incoming message, a method comprising, in response to receiving the incoming message directed to a plurality of client devices which are not the computing device, at approximately the same time, acts of:
performing a mitigation action that alters a presentation characteristic of the audible alert for the incoming message, wherein
the mitigation action ensures that the computing device and at least a subset of the client devices within a predefined audio range of the computing device do not audibly present alerts for the incoming message in an unsynchronized manner, wherein at least one of the acts are performed by the computing device.

2. The method of claim 1, further comprising acts of: determining the subset of the client devices.

3. The method of claim 1, further comprising acts of: presenting the audible alert in accordance with the altered presentation characteristic.

4. The method of claim 1, wherein the mitigation action causes the computing device to suppress a volume of the audible alert for the incoming message.

5. The method of claim 1, wherein the mitigation action performs at least one of:
altering a playback timing at which the computing device presents the audible alert;
synchronizing the audible alert played by the computing device with audible alerts for the incoming message played by the different client machines in audio range of the computing device; and
changes an audio file for the audible alert as presented on the computing device from a default that would have been used in absence of the mitigation action.

6. The method of claim 1, wherein the mitigation action minimizes aggregate noise pollution resulting from audible alerts from the computing device and the subset of the different client machines.

7. The method of claim 1, wherein the mitigation action causes the audible alert to be presented by the computing device to harmonize with other audible alerts presented by the subset of different client machines.

8. The method of claim 1, wherein the incoming message includes mitigation instructions, wherein the mitigation action of the computing device is based on the mitigation instructions.

9. The method of claim 1, wherein in absence of the mitigation action, the computing device would present the audible alert in a manner unsynchronized with audio alerts of the subset of the different client machines, thereby resulting in different disharmonious alerts being audibly provided for the incoming message in an audio environment proximate to the computing device.

10. The method of claim 1, wherein the incoming message is a text exchange associated with a text exchange session, wherein the computing device and the subset of different client machines participate in the text exchange session.

11. A computer program product comprising:
one or more non-transitory computer-readable storage devices;
program instructions, stored on at least one of the one or more non-transitory computer-readable storage devices, to receive an incoming message, the incoming message being one directed to a plurality of different client devices at approximately the same time, the computing device running a program instructions to as a default, present by default audible alerts upon receiving the incoming message; and
program instructions, stored on at least one of the one or more non-transitory computer-readable storage devices, to perform a mitigation action that alters a presentation characteristic of the audible alert for the incoming message, wherein the mitigation action ensures that the computing device and at least a subset of the different client devices within a predefined audio range of the computing device do not audibly present alerts for the incoming message in an unsynchronized manner.

* * * * *